United States Patent
Rabbat

(10) Patent No.: US 9,779,565 B2
(45) Date of Patent: Oct. 3, 2017

(54) METHOD AND APPARATUS FOR MANAGING OPERATION OF A DRIVER'S MOBILE TELEPHONE

(71) Applicant: Panasonic Automotive Systems Company of America, Division of Panasonic Corporation of North America, Peachtree City, GA (US)

(72) Inventor: Paul George Rabbat, Atlanta, GA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 0 days.

(21) Appl. No.: 15/078,281

(22) Filed: Mar. 23, 2016

(65) Prior Publication Data

US 2017/0076519 A1    Mar. 16, 2017

Related U.S. Application Data

(60) Provisional application No. 62/137,675, filed on Mar. 24, 2015.

(51) Int. Cl.
  *G07C 9/00* (2006.01)
  *G06K 9/00* (2006.01)
  *G08C 17/02* (2006.01)

(52) U.S. Cl.
  CPC ..... *G07C 9/00071* (2013.01); *G06K 9/00087* (2013.01); *G08C 17/02* (2013.01); *G06K 9/00006* (2013.01); *G08C 2201/51* (2013.01); *G08C 2201/93* (2013.01)

(58) Field of Classification Search
  CPC ............ G07C 9/00071; G07C 9/00158; G06K 9/00087; G06K 9/00006; G08C 17/02; G08C 2201/93; G08C 2201/51; G06F 2221/2139; G06F 21/32; G05B 1/00
  USPC ........................................ 340/5.53, 5.52, 5.2
  See application file for complete search history.

(56) References Cited

U.S. PATENT DOCUMENTS

| | | | | |
|---|---|---|---|---|
| 8,362,873 | B2* | 1/2013 | Miller | G06F 21/32 340/3.1 |
| 8,674,804 | B2* | 3/2014 | Miller | G05B 1/00 235/380 |
| 2014/0354402 | A1* | 12/2014 | Joao | G07C 9/00571 340/5.52 |

* cited by examiner

*Primary Examiner* — Ali Neyzari
(74) *Attorney, Agent, or Firm* — Laurence S. Roach, Esq.

(57) ABSTRACT

A motor vehicle controls operation of a mobile electronic device and includes a fingerprint sensor which scans a driver's fingerprint and produces a first electronic representation of the driver's fingerprint. A wireless transceiver receives from the mobile electronic device a first air-borne signal including a second electronic representation of the driver's fingerprint. An electronic processor determines whether the vehicle is in motion, compares the first electronic representation of the driver's fingerprint to the second electronic representation of the driver's fingerprint, and causes the transceiver to transmit a second air-borne signal to the mobile electronic device. The second air-borne signal instructs the mobile electronic device to disable itself. The second air-borne signal is transmitted only if the processor determines that the vehicle is in motion and ascertains as a result of the comparison that the first electronic representation of the driver's fingerprint matches the second electronic representation of the driver's fingerprint.

17 Claims, 2 Drawing Sheets

METHOD AND APPARATUS FOR MANAGING OPERATION OF A DRIVER'S MOBILE TELEPHONE

CROSS-REFERENCE TO RELATED APPLICATIONS

This application claims the benefit of U.S. Provisional Application No. 62/137,675, filed on Mar. 24, 2015, which the disclosure of which is hereby incorporated by reference in its entirety for all purposes.

BACKGROUND OF THE INVENTION

1. Field of the Invention

The present invention relates to a method of operating a mobile telephone, and, more particularly, a method of operating a mobile telephone while the owner of the mobile telephone is operating a motor vehicle.

2. Description of the Related Art

One problem addressed by the present invention is that a large percentage of automobile collisions are at least partially due to a driver being distracted by his cell phone. Another problem addressed by the present invention is that establishing a Bluetooth connection between a cell phone and an automobile is a somewhat cumbersome process and requires significant time and attention on the part of the human operator.

SUMMARY OF THE INVENTION

The invention may provide a method and apparatus of addressing the above two problems by enabling a motor vehicle to automatically recognize a driver's fingerprint by leveraging the capability of many smartphones to also recognize fingerprints.

In one embodiment of the invention, a fingerprint recognition sensor is included in the steering wheel of a vehicle. The sensor may be located on the inner lining where the driver typically grabs the steering wheel. Alternatively, the fingerprint recognition sensor may be provided on a pushbutton on the steering wheel, on the ignition pushbutton of the vehicle, on the driver's side exterior door handle, or on the key fob, for example.

In one embodiment, regardless of how the driver's fingerprint is recognized within the vehicle, if the driver's fingerprint matches the user's fingerprint stored on the cell phone, then the cell phone may be disabled while the vehicle is moving in order to avoid distracting the driver from his driving task. In one embodiment, the vehicle human-machine interface may continue to interact with both the cell phone and the driver, acting as an intermediary therebetween. For example, the vehicle human-machine interface may provide information from the cell phone only audibly to the driver in order to avoid diverting the driver's eyes from the road. Also, the vehicle human-machine interface may respond to, and transmit to the cell phone, only audible commands from the driver. In another example, the vehicle human-machine interface may provide information from the cell phone visibly through the vehicle dashboard, heads-up display, or infotainment system. Commands tactilely entered into the cell phone by the driver may be ignored in order discourage the driver from looking at or directly interacting with his cell phone. The display of the cell phone may also be disabled. When the vehicle comes to a stop, when the vehicle gear is in park, or when the vehicle ignition turns off, then the cell phone may be automatically enabled with no restrictions on its use.

In one embodiment, regardless of how the driver's fingerprint is recognized within the vehicle, if the driver's fingerprint matches the user's fingerprint stored on the cell phone, then the cell phone is semi-automatically paired with the vehicle electronics without the driver having to take any actions other than confirming that the pairing is called for. For example, the smartphone may automatically pair with the car when a matching fingerprint is detected. Instead of manually establishing a Bluetooth connection between the smartphone and the vehicle electronics, the vehicle human-machine interface may display a popup stating "Your phone has been recognized. Would you like to pair?"

The invention comprises, in one form thereof, a motor vehicle controlling operation of a mobile electronic device. The vehicle includes a fingerprint sensor which scans a driver's fingerprint and produces a first electronic representation of the driver's fingerprint. A wireless transceiver receives from the mobile electronic device a first air-borne signal including a second electronic representation of the driver's fingerprint. An electronic processor determines whether the vehicle is in motion, compares the first electronic representation of the driver's fingerprint to the second electronic representation of the driver's fingerprint, and causes the transceiver to transmit a second air-borne signal to the mobile electronic device. The second air-borne signal instructs the mobile electronic device to disable itself. The second air-borne signal is transmitted only if the processor both determines that the vehicle is in motion and ascertains as a result of the comparison that the first electronic representation of the driver's fingerprint matches the second electronic representation of the driver's fingerprint.

The invention comprises, in another form thereof, an arrangement for controlling operation of a mobile electronic device. The arrangement includes a motor vehicle and a mobile electronic device. The vehicle includes a first fingerprint sensor which scans a driver's fingerprint and produces a first electronic representation of the driver's fingerprint. A wireless transceiver of the vehicle transmits an air-borne signal including the first electronic representation of the driver's fingerprint. The mobile electronic device includes a user interface and a wireless transceiver which receives the air-borne signal. The device includes a second fingerprint sensor which scans the driver's fingerprint and produces a second electronic representation of the driver's fingerprint. An electronic processor of the device determines whether the vehicle is in motion, and compares the first electronic representation of the driver's fingerprint to the second electronic representation of the driver's fingerprint. The device disables the user interface only if the processor both determines that the vehicle is in motion and ascertains that the first electronic representation of the driver's fingerprint and the second electronic representation of the driver's fingerprint are substantially similar and indicative of a same driver.

The invention comprises, in yet another form thereof, a method of controlling operation of a mobile electronic device, including reading a driver's fingerprint by use of a fingerprint sensor associated with a motor vehicle. A first electronic representation of the driver's fingerprint is produced dependent upon the reading step. It is determined whether the vehicle is in motion. The first electronic representation of the driver's fingerprint is compared to a second electronic representation of the driver's fingerprint from the mobile electronic device. At least one feature of the mobile electronic device is disabled only if it is determined in the determining step that the vehicle is in motion and it is ascertained dependent upon the comparing step that the first electronic representation of the driver's fingerprint matches the second electronic representation of the driver's fingerprint.

An advantage of the present invention is that it simplifies wireless connection of the cell phone to the vehicle as compared to the steps required to establish a Bluetooth connection.

Another advantage is that it prevents the driver from being distracted by his cell phone while driving.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
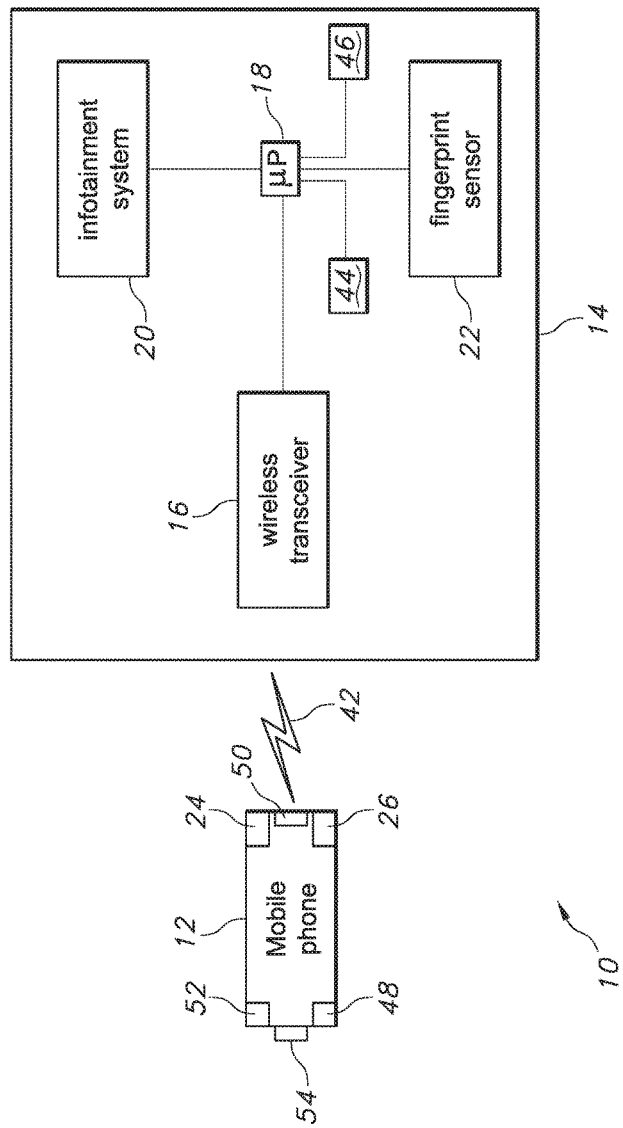
FIG. 1 is a block diagram of one embodiment of an arrangement of the present invention for operating a cell phone in conjunction with a vehicle.

FIG. 1 is a block diagram of one embodiment of an arrangement 10 of the present invention for operating a mobile cell phone 12 in conjunction with a vehicle 14 including a wireless transceiver 16, a processor or control module 18, an infotainment system 20, and a fingerprint sensor 22. Mobile phone 12 engages in bidirectional wireless communication with wireless transceiver 16. Mobile phone 12 includes a fingerprint scanner or reader 24, which may be incorporated into a pushbutton or touchbutton of phone 12, for example. Mobile phone 12 also includes a memory device or database 26 in which digital representations of the user's scanned fingerprints are stored after having been read by reader 24.

Figure 2:
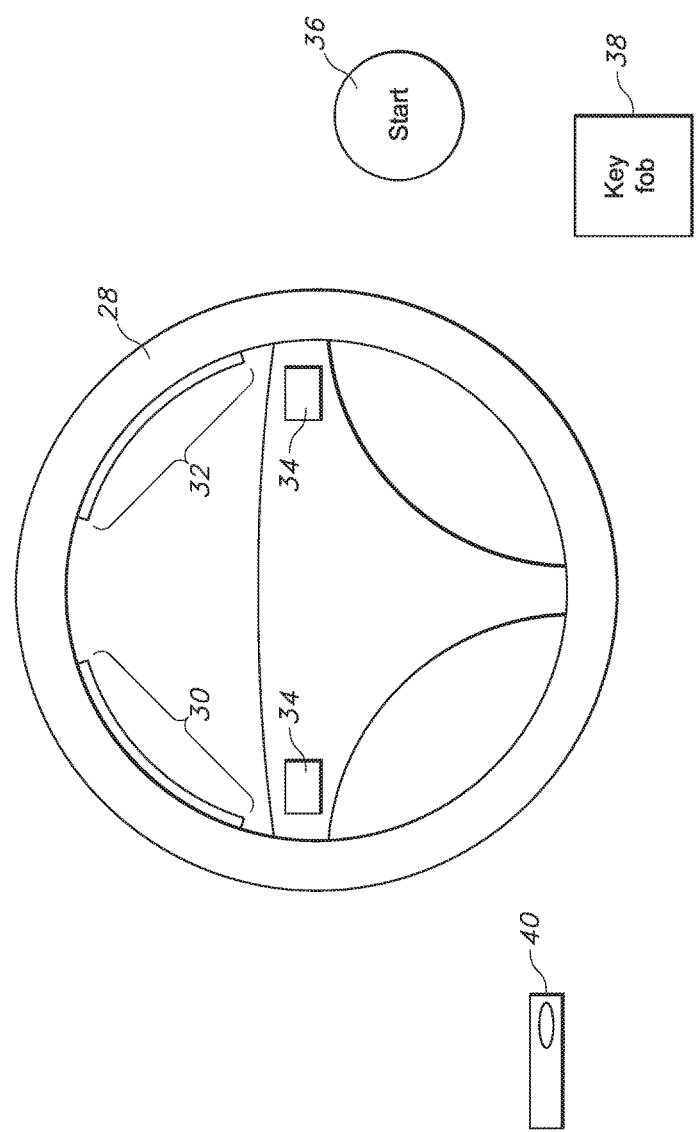
FIG. 2 is a schematic diagram illustrating possible locations of the in-vehicle fingerprint sensor of FIG. 1.

Fingerprint sensor 22 may be in the form of a plurality of fingerprint scanners evenly spaced out along the radially inward-facing surfaces of the upper half of a steering wheel 28 (FIG. 2), such as in arcuate areas 30, 32. Alternatively, or in addition, fingerprint sensor 22 may be disposed on or incorporated in: steering wheel pushbuttons 34, a Start pushbutton 36 on a vehicle dashboard for ignition of the vehicle; a key fob 38; and/or an exterior door handle 40 of the vehicle.

Before use, mobile phone 12 may scan and store digital representations of each of the user's ten fingers. More particularly, fingerprint scanner 24 may scan each of the user's fingers individually and store the respective digital representations in memory device 26.

During use, the user may carry mobile phone 12 on his person as he approaches vehicle 14. As the user attempts to enter vehicle 14 and sit behind steering wheel 28, one of his fingerprints may be scanned by a fingerprint sensor 40 on the driver's door handle, or by a fingerprint sensor 38 on the key fob, for example. After the user enters vehicle 14 and sits in the driver's seat, one of his fingerprints may be scanned by a fingerprint sensor 36 on the vehicle start pushbutton; by a fingerprint sensor 34 on a steering wheel keypad; or by a fingerprint sensor disposed on the inner radial surface of steering wheel 28 in areas 30, 32.

Upon sensing the user entering vehicle 14, for example by sensing the user touching the door handle, opening the vehicle door, sitting in a seat within vehicle 14, or touching the ignition pushbutton, transceiver 16 may emit a signal, e.g., a beacon signal, in order to initiate wireless bi-directional communication between mobile phone 12 and vehicle controller 18, as indicated at 42.

After communication has been established between mobile phone 12 and vehicle controller 18, the digital fingerprint representations may be transmitted from mobile phone 12 to vehicle controller 18 and/or from vehicle controller 18 to mobile phone 12. Mobile phone 12 and/or vehicle controller 18 may then compare the fingerprint representations created by phone 12 to the fingerprint representations created by vehicle 14. If these two sets of fingerprint representations match each other and are substantially identical, then it may be determined that phone 12 belongs to the driver of vehicle 14.

In response to sensing that vehicle 14 is in motion, such as from GPS module 44 or speedometer 46 on vehicle, or from GPS module 48 on phone 12, for example, and in addition to sensing that phone 12 belongs to the driver of vehicle 14, phone 12 may be disabled such that it will not distract the driver from his driving task. For example, a display screen, a keyboard, an audio output port, and/or an audio speaker of phone 12 may be disabled. In another embodiment, phone 12 is disabled whenever the vehicle ignition is ON. In yet another embodiment, phone 12 is disabled whenever the vehicle gear is not in PARK. Controller 18 may transmit a signal to phone 12 to disable phone 12.

In response to sensing that vehicle 14 is no longer in motion, such as from GPS module 44 or speedometer 46 on vehicle, or from GPS module 48 on phone 12, for example, phone 12 may be again enabled. For example, a display screen, keyboard, and/or audio speaker of phone 12 may be again enabled. In another embodiment, phone 12 is re-enabled whenever the vehicle ignition is OFF. In yet another embodiment, phone 12 is re-enabled whenever the vehicle gear is in PARK. Controller 18 may transmit a signal to phone 12 to enable phone 12.

Mobile electronic device 12 may also include a wireless transceiver 50, a processor 52, and a user interface 54 including a display screen, an audio speaker and a keyboard.

In one embodiment, the cell phone can be instantly enabled through an "emergency" feature, even when the vehicle is in motion. For example, the cell phone may have an emergency pushbutton that can be pressed to enable the phone whenever it is disabled. Alternatively, or in addition, the vehicle dashboard may have a pushbutton or other actuatable device that automatically enables the phone. The pushbutton may be dedicated for the phone enabling purpose, or can serve another function. For example, the phone may be enabled in response to the vehicle hazard pushbutton being pressed, even when the vehicle is in motion.

Although the present invention has been described herein as being used in conjunction with fingerprint sensors both on a cell phone and within a vehicle, it is to be understood that the invention may be implemented with types of biometric sensors other than fingerprint sensors. For example, the invention may be implemented with facial recognition sensors or pupil recognition sensors on both the cell phone and the vehicle. It is also possible to implement the invention with the cell phone and vehicle having different types of biometric sensors. In this case, one or both of the cell phone and the vehicle may include a database in which biometric sensor data is stored in association with human identity data. Thus, a set of data from one type of biometric sensor may be matched with a set of data from another type of biometric sensor in order to determine that the two sets of data are associated with a same human being.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor vehicle configured for controlling operation of a mobile electronic device, the vehicle comprising:
   a fingerprint sensor disposed on an inner radially-facing surface of a steering wheel of the vehicle and configured to scan a driver's fingerprint and produce a first electronic representation of the driver's fingerprint;
   a wireless transceiver configured to receive from the mobile electronic device a first air-borne signal including a second electronic representation of the driver's fingerprint; and
   an electronic processor configured to:
      determine whether the vehicle is in motion;
      compare the first electronic representation of the driver's fingerprint to the second electronic representation of the driver's fingerprint; and
      cause the transceiver to transmit a second air-borne signal to the mobile electronic device, the second air-borne signal instructing the mobile electronic device to disable itself, the second air-borne signal being transmitted only if the processor both determines that the vehicle is in motion and ascertains as a result of the comparison that the first electronic representation of the driver's fingerprint matches the second electronic representation of the driver's fingerprint.

2. The vehicle of claim 1 wherein the processor determines whether the vehicle is in motion based on at least one of:
   a first GPS signal originating within the vehicle;
   a second GPS signal originating within the mobile electronic device; and
   a signal from a speedometer within the vehicle.

3. The vehicle of claim 1 wherein the second air-borne signal instructs the mobile electronic device to disable at least a portion of a user interface of the mobile electronic device.

4. A motor vehicle configured for controlling operation of a mobile electronic device, the vehicle comprising:
   a fingerprint sensor configured to scan a driver's fingerprint and produce a first electronic representation of the driver's fingerprint;
   a wireless transceiver configured to receive from the mobile electronic device a first air-borne signal including a second electronic representation of the driver's fingerprint; and
   an electronic processor configured to:
      determine whether the vehicle is in motion;
      compare the first electronic representation of the driver's fingerprint to the second electronic representation of the driver's fingerprint; and
      cause the transceiver to transmit a second air-borne signal to the mobile electronic device, the second air-borne signal instructing the mobile electronic device to disable itself and disable all tactile and visual portions of the user interface of the mobile electronic device, but not disable audial portions of the user interface of the mobile electronic device, the second air-borne signal being transmitted only if the processor both determines that the vehicle is in motion and ascertains as a result of the comparison that the first electronic representation of the driver's fingerprint matches the second electronic representation of the driver's fingerprint.

5. The vehicle of claim 4 wherein the processor is configured to enable the driver to interact with the mobile electronic device exclusively through voice commands after all tactile and visual portions of the user interface of the mobile electronic device have been disabled.

6. The vehicle of claim 1 wherein the second air-borne signal instructs the mobile electronic device to disable the display screen and all pushbuttons of the mobile electronic device.

7. An arrangement for controlling operation of a mobile electronic device, the arrangement comprising:
   a motor vehicle including:
      a first fingerprint sensor disposed on an inner radially-facing surface of a steering wheel of the vehicle and configured to scan a driver's fingerprint and produce a first electronic representation of the driver's fingerprint; and
      a wireless transceiver configured to transmit an air-borne signal including the first electronic representation of the driver's fingerprint; and
   a mobile electronic device including:
      a user interface;
      a wireless transceiver configured to receive the air-borne signal;
      a second fingerprint sensor configured to scan the driver's fingerprint and produce a second electronic representation of the driver's fingerprint;
      an electronic processor configured to:
         determine whether the vehicle is in motion;
         compare the first electronic representation of the driver's fingerprint to the second electronic representation of the driver's fingerprint; and
         disable the user interface only if the processor both determines that the vehicle is in motion and ascertains that the first electronic representation of the driver's fingerprint and the second electronic representation of the driver's fingerprint are substantially similar and indicative of a same said driver.

8. The arrangement of claim 7 wherein the processor determines whether the vehicle is in motion based information received from the vehicle.

9. The arrangement of claim 7 wherein the disabling of the user interface includes inhibiting operation of a keyboard, a display screen and/or an audio output of the user interface.

10. The arrangement of claim 7 wherein the processor determines whether the vehicle is in motion based on at least one of:
   a first GPS signal originating within the vehicle;
   a second GPS signal originating within the mobile electronic device; and
   a signal from a speedometer within the vehicle.

11. An arrangement for controlling operation of a mobile electronic device, the arrangement comprising:
a motor vehicle including:
  a first fingerprint sensor configured to scan a driver's fingerprint and produce a first electronic representation of the driver's fingerprint; and
  a wireless transceiver configured to transmit an airborne signal including the first electronic representation of the driver's fingerprint; and
a mobile electronic device including:
  a user interface;
  a wireless transceiver configured to receive the airborne signal;
  a second fingerprint sensor configured to scan the driver's fingerprint and produce a second electronic representation of the driver's fingerprint;
  an electronic processor configured to:
    disable all tactile and visual portions of the user interface, but not disable audial portions of the user interface;
    determine whether the vehicle is in motion;
    compare the first electronic representation of the driver's fingerprint to the second electronic representation of the driver's fingerprint; and
    disable the user interface only if the processor both determines that the vehicle is in motion and ascertains that the first electronic representation of the driver's fingerprint and the second electronic representation of the driver's fingerprint are substantially similar and indicative of a same said driver.

12. The arrangement of claim 11 wherein the processor is configured to enable the driver to interact with the mobile electronic device exclusively through voice commands, the vehicle dashboard, vehicle heads-up display, or vehicle infotainment system, after all tactile and visual portions of the mobile electronic device user interface have been disabled.

13. The arrangement of claim 11 wherein the processor is configured to disable the display screen and all pushbuttons of the mobile electronic device.

14. A method of controlling operation of a mobile electronic device, the method comprising:
reading a driver's fingerprint by use of a fingerprint sensor disposed on an inner radially-facing surface of a steering wheel of a motor vehicle, a steering wheel pushbutton, a dashboard start pushbutton, a key fob, or a vehicle door handle;
producing a first electronic representation of the driver's fingerprint dependent upon the reading step;
determining whether the vehicle is in motion;
comparing the first electronic representation of the driver's fingerprint to a second electronic representation of the driver's fingerprint from the mobile electronic device; and
disabling at least one feature of the mobile electronic device only if:
  it is determined in the determining step that the vehicle is in motion; and
  it is ascertained dependent upon the comparing step that the first electronic representation of the driver's fingerprint matches the second electronic representation of the driver's fingerprint.

15. The method of claim 14 wherein the at least one feature of the mobile electronic device comprises a user interface of the mobile electronic device.

16. A method of controlling operation of a mobile electronic device, the method comprising:
reading a driver's fingerprint by use of a fingerprint sensor associated with a motor vehicle;
producing a first electronic representation of the driver's fingerprint dependent upon the reading step;
determining whether the vehicle is in motion;
comparing the first electronic representation of the driver's fingerprint to a second electronic representation of the driver's fingerprint from the mobile electronic device; and
disabling at least one feature of the mobile electronic device only if:
  it is determined in the determining step that the vehicle is in motion; and
  it is ascertained dependent upon the comparing step that the first electronic representation of the driver's fingerprint matches the second electronic representation of the driver's fingerprint, wherein the disabling step includes disabling all tactile and visual portions of a user interface of the mobile electronic device, but not disabling audial portions of the user interface.

17. The method of claim 16 further comprising enabling the driver to interact with the mobile electronic device exclusively through voice commands, the vehicle dashboard, vehicle heads-up display, or vehicle infotainment system, after all the tactile and visual portions of the user interface have been disabled.

* * * * *